US010165021B2

(12) United States Patent
Hillis et al.

(10) Patent No.: US 10,165,021 B2
(45) Date of Patent: *Dec. 25, 2018

(54) METHOD AND APPARATUS FOR ESTABLISHING DATA LINK BASED ON AUDIO CONNECTION

(71) Applicant: APPLIED INVENTION, LLC, Glendale, CA (US)

(72) Inventors: W. Daniel Hillis, Toluca Lake, CA (US); Dev Kumar, Glendale, CA (US)

(73) Assignee: Applied Invention, LLC, Burbank, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 14/565,344

(22) Filed: Dec. 9, 2014

(65) Prior Publication Data

US 2015/0092618 A1  Apr. 2, 2015

Related U.S. Application Data

(63) Continuation of application No. 13/649,943, filed on Oct. 11, 2012, now Pat. No. 8,923,493, which is a continuation of application No. 12/574,574, filed on Oct. 6, 2009, now Pat. No. 8,300,783, which is a continuation-in-part of application No. 12/368,192, filed on Feb. 9, 2009, now Pat. No. 8,542,807.

(51) Int. Cl.
*H04L 29/06* (2006.01)
*H04M 1/253* (2006.01)

(52) U.S. Cl.
CPC ........ *H04L 65/403* (2013.01); *H04L 63/0861* (2013.01); *H04L 65/1053* (2013.01); *H04M 1/2535* (2013.01)

(58) Field of Classification Search
CPC .... H04M 11/062; H04M 7/006; H04M 3/493; H04M 3/567; H04M 1/2535
See application file for complete search history.

(56) References Cited

U.S. PATENT DOCUMENTS

| | | | |
|---|---|---|---|
| 5,636,282 A | 6/1997 | Holmquist et al. |
| 5,949,763 A | 9/1999 | Lund et al. |
| 6,163,335 A | 12/2000 | Barraclough et al. |
| 6,256,389 B1 | 7/2001 | Dalrymple et al. |
| 6,356,622 B1 | 3/2002 | Hassell et al. |
| 6,538,996 B1 | 3/2003 | West et al. |
| 6,665,392 B1 | 12/2003 | Wellner et al. |
| 6,778,645 B1 | 8/2004 | Rao et al. |
| 6,891,825 B1 | 5/2005 | O'Dell et al. |
| 6,959,074 B2 | 10/2005 | Berstis |
| 7,053,923 B1 | 5/2006 | Hamilton |
| 7,103,009 B1 | 9/2006 | Shaffer et al. |
| 7,525,990 B2 | 4/2009 | Bossemeyer et al. |
| 7,894,806 B2 | 2/2011 | Leigh et al. |

(Continued)

*Primary Examiner* — Jung Park
(74) *Attorney, Agent, or Firm* — Michael A. Glenn; Perkins Coie LLP

(57) ABSTRACT

In a communications system, after parties form a voice telephone connection, the parties respective communications devices automatically create or leverage machine readable features or content of the telephone connection to identify the parties to each other or to a rendezvous server, and thereafter the communications devices and/or the rendezvous server automatically establishes a data link between the parties.

23 Claims, 7 Drawing Sheets

(56) References Cited

U.S. PATENT DOCUMENTS

| | | |
|---|---|---|
| 7,916,635 B2 | 3/2011 | Casey et al. |
| 7,920,158 B1 | 4/2011 | Beck et al. |
| 7,978,827 B1 | 7/2011 | Becker et al. |
| 8,201,220 B2 | 6/2012 | Casey et al. |
| 8,208,616 B2 | 6/2012 | Sastry |
| 8,311,199 B2 | 11/2012 | Helbling et al. |
| 8,761,736 B2 | 6/2014 | MacDonald et al. |
| 2001/0038689 A1* | 11/2001 | Liljestrand ........ H04M 3/42153 379/201.03 |
| 2002/0109770 A1 | 8/2002 | Terada |
| 2002/0154210 A1 | 10/2002 | Ludwig |
| 2003/0026274 A1 | 2/2003 | Droz |
| 2003/0026397 A1 | 2/2003 | McCroskey |
| 2003/0069931 A1* | 4/2003 | Omura ................. G06F 3/0481 709/205 |
| 2003/0072429 A1* | 4/2003 | Slobodin ............ H04L 12/1818 379/202.01 |
| 2004/0119814 A1 | 6/2004 | Clisham et al. |
| 2004/0213207 A1 | 10/2004 | Silver et al. |
| 2004/0258222 A1 | 12/2004 | Kobrosly et al. |
| 2005/0076081 A1 | 4/2005 | Rui et al. |
| 2005/0099492 A1 | 5/2005 | Orr |
| 2005/0238158 A1 | 10/2005 | Nguyen et al. |
| 2007/0083246 A1 | 4/2007 | Mazar et al. |
| 2007/0126862 A1 | 6/2007 | Even et al. |
| 2007/0127510 A1 | 6/2007 | Bossemeyer et al. |
| 2007/0188598 A1* | 8/2007 | Kenoyer ................. H04N 7/15 348/14.08 |
| 2008/0016156 A1 | 1/2008 | Miceli et al. |
| 2008/0226051 A1 | 9/2008 | Srinivasan et al. |
| 2008/0298278 A1 | 12/2008 | Thakkar et al. |
| 2009/0196406 A1* | 8/2009 | Brown ................ H04M 7/0027 379/93.17 |
| 2009/0201921 A1 | 8/2009 | Bossemeyer et al. |
| 2009/0318779 A1 | 12/2009 | Tran |
| 2010/0029308 A1 | 2/2010 | Tims et al. |
| 2010/0031338 A1 | 2/2010 | Poore et al. |
| 2010/0061535 A1 | 3/2010 | Diethorn et al. |
| 2010/0202440 A1 | 8/2010 | Hillis et al. |

* cited by examiner

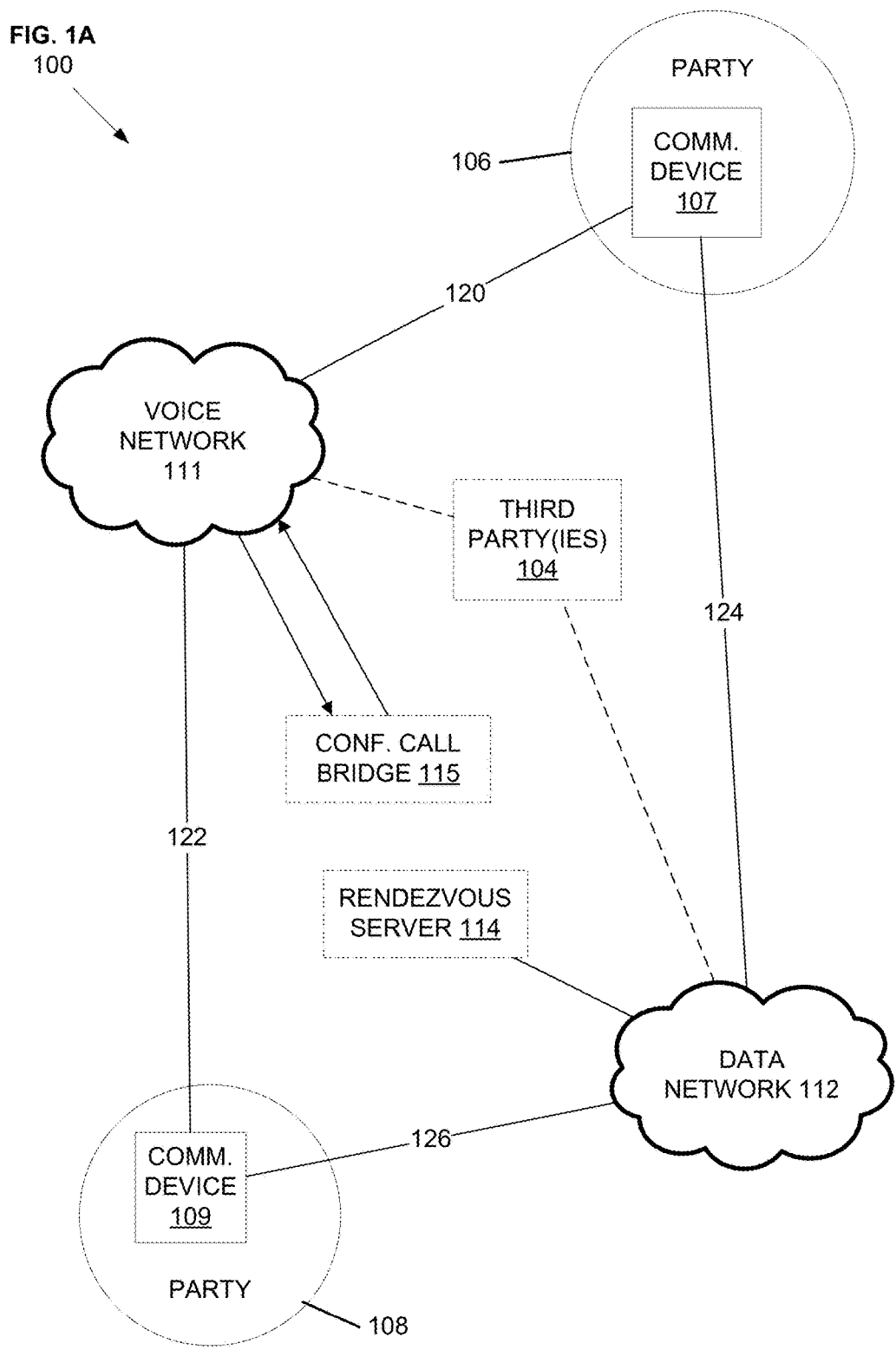

150

170

400

500

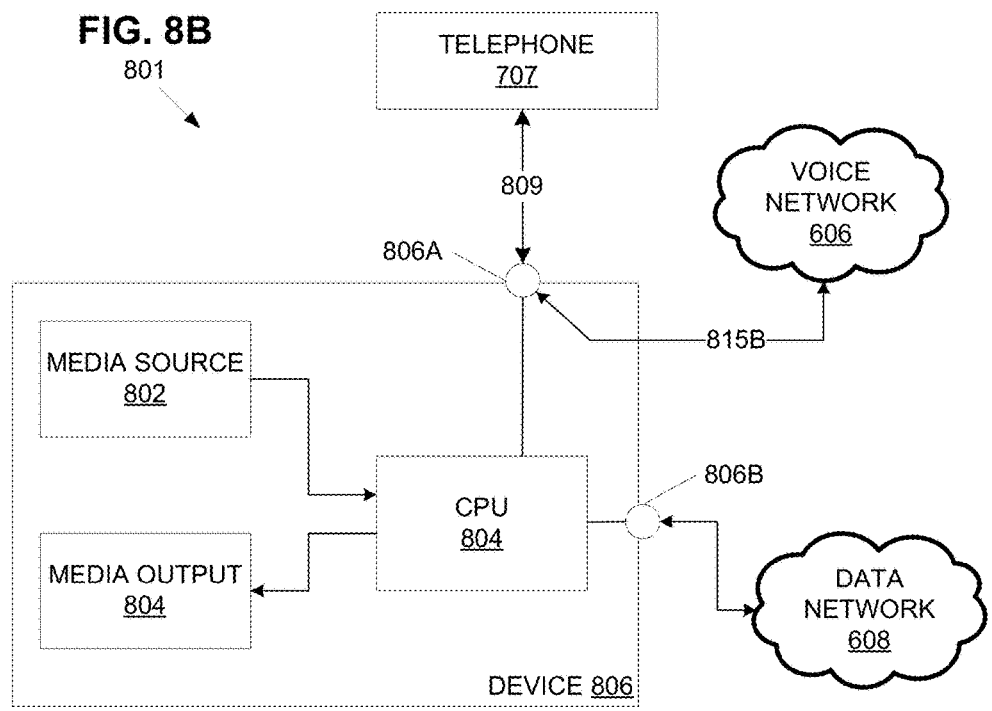
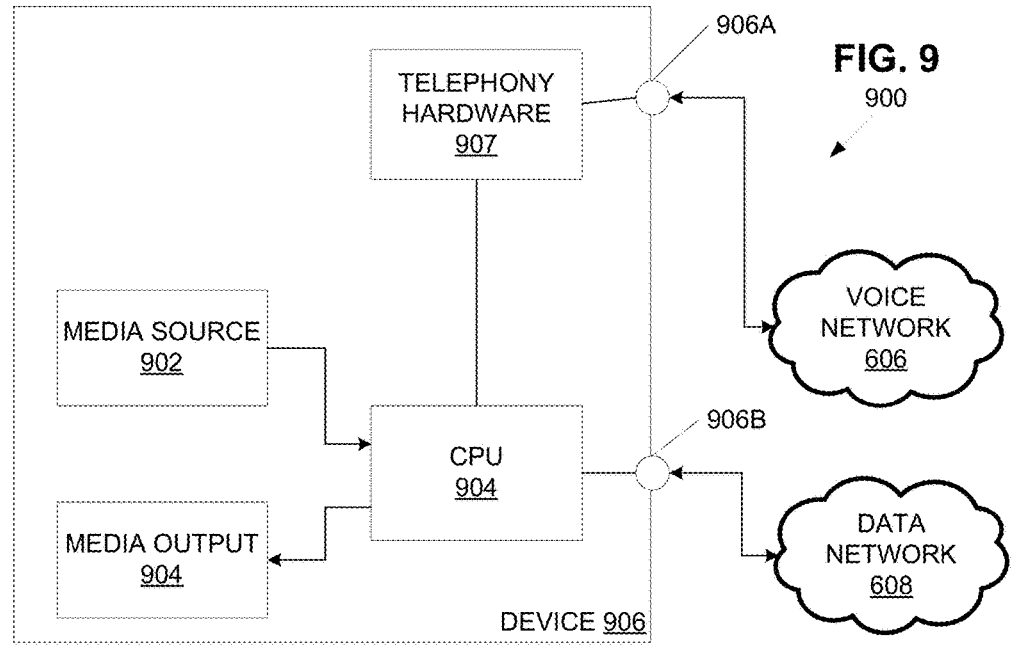

METHOD AND APPARATUS FOR ESTABLISHING DATA LINK BASED ON AUDIO CONNECTION

CROSS-REFERENCE TO RELATED APPLICATIONS

This application is a continuation of U.S. patent application Ser. No. 13/649,943, filed Oct. 11, 2012, which was issued as U.S. Pat. No. 8,923,493 on Dec. 30, 2014, which is a continuation of U.S. patent application Ser. No. 12/574,574, filed Oct. 6, 2009, issued as U.S. Pat. No. 8,300,783, on Oct. 30, 2012, and which is a continuation-in-part of the following application, and claims the benefit thereof in accordance with 35 USC 120: U.S. application Ser. No. 12/368,192, filed on Feb. 9, 2009, issued as U.S. Pat. No. 8,542,807 on Sep. 24, 2013. The entirety of each of the foregoing applications is hereby incorporated herein by this reference thereto.

BACKGROUND OF THE INVENTION

1. Field of the Invention

The invention relates to multimedia conferencing over a digital network. More particularly, the invention provides a way to set up a multimedia conference automatically by leveraging machine-readable features or content from a previously established audio connection.

2. Description of the Related Art

The increasing ubiquity of digital network access has led to a corresponding increase in the number of digital communications applications available to the consumer. The capabilities offered by voice-over-internet-protocol (VoIP) systems, video teleconferencing software, and other distance collaboration tools far exceed those available over traditional voice phone lines. Nonetheless, many users still find such applications inconvenient to use. User frustration stems from the relative complexity of installation and configuration, poor reliability, variable connection quality, incompatibility among competing systems, and the increased effort required to establish connections during subsequent use.

For instance, with a video conference call under today's technology, the participants must operate their computers to obtain an IP address, note this IP address, and then send the IP address to the other participants by email, chat, or phone. Each participant must also wait to receive the others' IP addresses by email or chat or phone, make a note of them, and enter the received IP addresses in their own video conferencing software. Finally, with all data entered, the participants wait for their video conferencing software packages to interconnect. For many users, this is a time-consuming, frustrating process, fraught with technical minutiae.

While many applications do simplify the connection process by saving the settings for frequently established connections as "sessions," none have matched the convenience, universality, and reliability offered by Plain Old Telephone Service (POTS).

SUMMARY OF THE INVENTION

After parties form a voice telephone connection, the parties' respective communications devices automatically create or leverage machine readable features or content of the telephone connection to identify the parties to each other or to a rendezvous server, and thereafter the communications devices and/or the rendezvous server automatically establishes a data link between the parties.

BRIEF DESCRIPTION OF THE DRAWINGS

FIG. 1A shows an overall system view, in block diagram.

FIGS. 6-9 are block diagrams showing the hardware components and interconnections of different examples of communications apparatus.

DETAILED DESCRIPTION

Figure 1B:
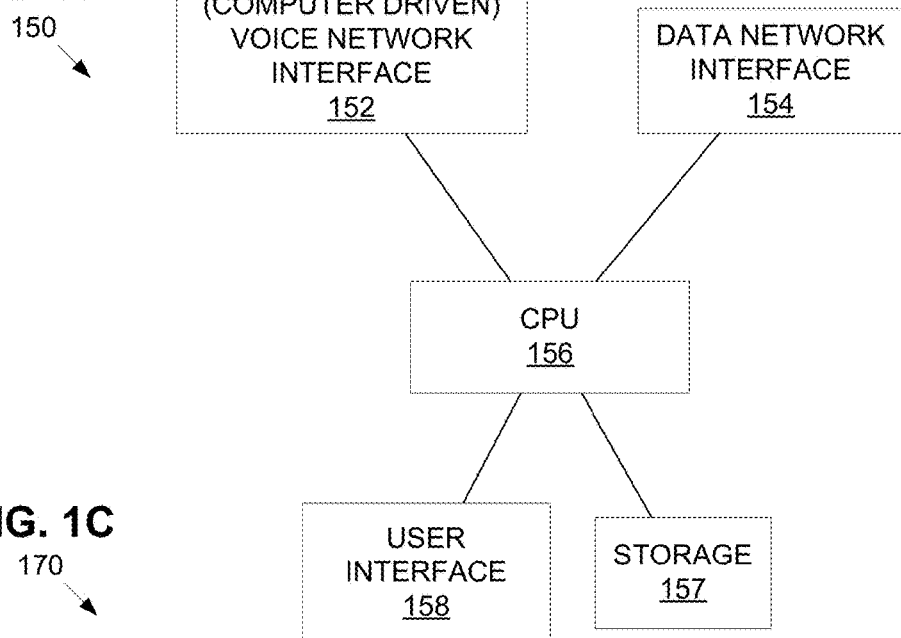
FIGS. 1B-1C show some different communications apparatuses, in block diagram.

One aspect of the invention is a communications device that leverages machine-readable content or features of a POTS connection to establish a data link over a digital network automatically. Establishing the data link requires little or no effort from the user beyond that required for establishing the POTS connection, namely, dialing a telephone number. In one embodiment, this device is fully functional as a conventional POTS phone. For instance, the device may have the look and feel of a traditional phone, and allow a user to establish a POTS connection through the familiar dialing process. The device may also offer handset, headset, and speakerphone functionality.

Additionally, the device is capable of communicating over a digital network, and may include additional input/output devices, such as a still or video camera, keypad, keyboard, color display, or video input/output ports, for receiving and rendering information transmitted and received over the data link. Thus, the device is capable of establishing a digital communications link, as well as a POTS connection with one or more remote devices, as well as one or more conventional POTS telephones. Once established, the data link is used to transfer data that enhances the interaction provided by the POTS connection.

Hardware Components and Interconnections

System Architecture

FIG. 1A shows a system 100 for establishing a data link between two or more parties. In addition to "data link," this disclosure may also employ other terms such as digital connection, data connection, digital call, and the like, without any intended limitation.

Parties to this data link are indicated by 106, 108. Optionally, one or more third parties party such as 104 may also participate, but this example uses two parties to illustrate the related concepts. Each party has a novel communications device 107, 109 (hereinafter "device"), which includes a telephone and a computer, as discussed in detail below. The telephone is electrically connected to the computer or integrated into the computer. First, the parties 106, 108 establish a normal telephone call, such as a dial-up call, via the voice network 111. This may be formed directly or through a conference calling bridge 115. The devices 107, 109 link to the voice network 111 via links 120, 122. One example of the voice network 111 is a POTS telephone network.

As explained in greater detail below, the devices 107, 109 leverage this voice call to establish a data link automatically over the data network 112, with a minimum of effort by the human parties.

In one embodiment, the devices 107, 109 exchange network addresses using acoustic signals conveyed over the voice network 111, and then use these network addresses to set up a data link over the data network 112.

In another embodiment, the devices 107, 109 employ a rendezvous server 114, and the devices 107, 109 or the bridge 115 use caller ID or another calling number identification (CNID) code to identify the devices to the rendezvous server 114. The server 114 uses the identifying information to match the participating devices, and then completes, or instructs the parties to complete, the data link.

In a different embodiment, the devices 107, 109 compute a digital soundprint based on content of the voice call, and submit their soundprints to the server 114. The server, encountering matching soundprints, completes or instructs the parties to complete the data link. Without any intended limitation, the term "soundprint" is used for ease of explanation, but this feature may also be referred to as an "acoustic fingerprint" or "digital fingerprint."

As mentioned above, the system 100 may optionally employ a conference calling bridge 115 to aid in setting up the voice connection between the parties 106, 108 (and 104 if applicable). In one embodiment, the bridge 115 is implemented by systems providing conventional voice conference calling, such as those provided by companies such as AT&T, Sprint, MCI, and the like. In a different embodiment, the bridge 115 may be implemented by proprietary equipment operated by entity that operates the rendezvous server 114, or an affiliate of this entity, in which case the bridge 115 and server 114 equipment may be (optionally) combined.

Voice Network. This disclosure uses the term "POTS" for brevity, ease of description, and accuracy as to most embodiments. This term is used as a convenient handle for any publicly accessible telephone network, which in many cases, is accessed by dialing a telephone number. The network may be partially or completely public. One example is a network of mostly copper lines and microwave relays, known as the public switched telephone network (PSTN). Access to the PSTN at one or both parties 106, 108 may occur through telephone lines of a local company, or through other means of access such as mobile phones, ship-to-shore, satellite phones, etc. Another means of accessing the PSTN, which is becoming increasingly popular, is VoIP. The voice network 111 (interchangeably referred to as "POTS network") includes all of these, and any conceivable alternatives for humans to conveniently place a telephone call to another party via the PSTN, either directly or bridged in some way to the PSTN, initiated by dialing a number or other means.

Digital Network. The digital network 112 may be implemented in various forms of digital communications network. One example is a packet switched network such as the public Internet. Other examples include a private Intranet, wide area network, local network, or any other network providing sufficient functionality for the purposes described herein. Devices on the network 112 have a unique address, such as an IP address in embodiments that use Internet Protocol.

Rendezvous Server. The server 114, coupled to the network 112, may be implemented by any computing device of suitable processing and storage ability to fulfill the functional requirements discussed herein. Broadly, the server 114 acts as a rendezvous site to receive and verify data link setup requests from the parties and, once verified, to advise each party of the other party's network address or to form a connection between the parties. The server is known in advance to all parties equipped with a communication device (such as 107, 109). The devices 107, 109, for example, may have the server's addresses or other unique identification embedded in the devices' storage. The server may also be implemented by a distributed network of computers sharing the duties of facilitating call connection using known addresses or network port numbers.

Communication Devices

Two Broad Embodiments

Figure 1C:
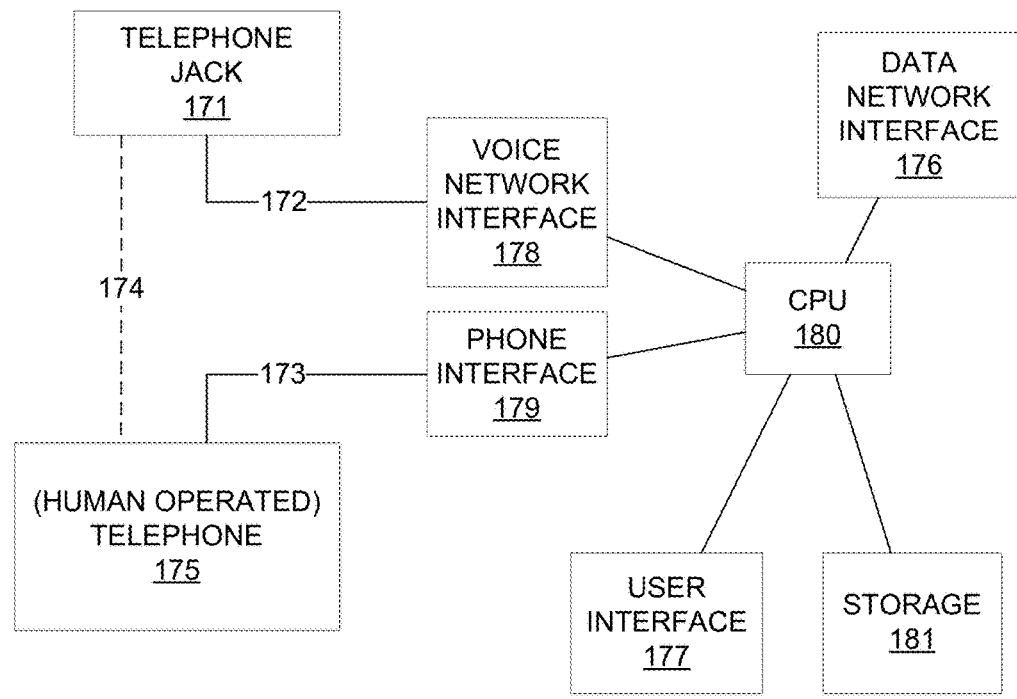

FIGS. 1B-1C show two different embodiments of a communication device. In each of these examples, the illustrated communication device includes a telephone component and a computer component, as explained below in greater detail. In both examples, the telephone component is electrically connected or integrated into the computer. The telephone component is used to place a POTS telephone call. The computer component assists with a process of leveraging the POTS call or a machine-readable feature of the call to identify the parties and automatically establish a data link between confirmed parties.

The system 150 (FIG. 1B) uses a telephone that is integrated into the computer, and may even be indistinguishable from the computer. This approach avoids having to use a conventional telephone. In contrast, the apparatus 170 (FIG. 1C) uses a conventional telephone 175, along with various computer components.

Referring to FIG. 1B, a user interface 158 includes a microphone and speaker, as well as a physical keypad, touch screen video keypad, or any one of the many well-known human interfaces for dialing. The interface 158 also includes a display for use in video conferencing, which may be satisfied by a video monitor of any technology suitable to the purposes described herein. Also included in the interface 158 is some video capture means such as a webcam, still camera, video camera, etc. This is used to convey the party's image to other parties of the data link. These various components of the user interface 158 are described together, as they all satisfy a user interface function, and they can (but need not) be integrated in hardware.

In the embodiment of FIG. 1B, the user dials a telephone number using the user interface 158. The CPU 156 operates the voice network interface 152 to place the POTS call. The interface 152 may be satisfied by a telephone DAA (direct access arrangement) for example, or another known component capable of satisfying the functional requirements of this disclosure. Ultimately, the CPU 156 employs the data network interface 154 to connect to the other party via the data network 112 (FIG. 1A). The interface 154 may be implemented by a broadband modem, Ethernet card, wireless modem, or satellite interface, to name a few options. The device 150 also includes digital data storage 157 coupled to the CPU 156, for long-term storage of data such as the associated party's telephone number, a network address or domain or URL of the rendezvous server 114, and other such data.

Turning to FIG. 1C, the system 170 includes some computer components along with a conventional telephone 175. In the case of a landline home telephone, the telephone 175 would normally be attached to an RJ-11 jack 171 or other wall socket via a cord 174. However, in this embodiment, the cord 174 is removed, and the CPU 180 and various interfaces 178-179 are inserted between the telephone 175 and the jack 171. The phone interface 179 is implemented by hardware such as a DAA (direct access arrangement), Analog-to-Digital Converters, Digital-to-Analog Converters, Audio Codecs, amplifiers, etc. The components 178, 176, 180, and 181 may be implemented as described for similarly named components (152, 154, 156, 157) from FIG. 1B.

In the example of FIG. 1C, since dialing is accomplished on the telephone 175, then the user interface 177 need not include a keypad, and in fact, a single pushbutton, flip switch, or other input tool may serve well to start and stop the digital link. On the other hand, the CPU 180 may complete and/or conclude the digital link automatically, in which case the single key button may be omitted as appropriate. The interface 177 nevertheless includes the same microphone, speaker, camera, and video monitor components as with the interface 158 of FIG. 1A.

Four More Specific Embodiments

Figure 6:
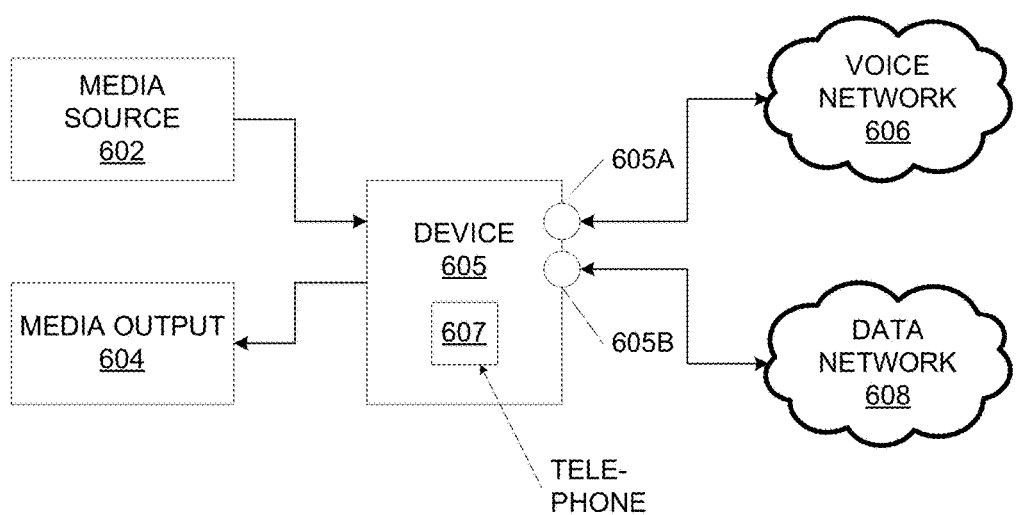

FIGS. 6-9 illustrate some more specific examples of various communications systems. FIG. 6 shows a communications system 600 with an internal telephone 607. The telephone 607 includes components such as a telephone modem and other appropriate equipment for the device 605 to carry out the functionality of a telephone by connecting to the voice network 606. A communications device 605 is coupled to a media source 602 and a media output 604. The media source 602 is a source of digital data available for the device 605 to share with remote parties over the data network 608. Accordingly, the source 602 may include items such as an internal or external hard drive, designated files or file folders on a hard drive, a digital camera, a thumb drive, a networked storage location, or other source of digital data. The media output 604 may be implemented by various devices for providing a human output such as a display, speaker, and such. As an example, the media source 602 and media output 604 may be implemented in similar fashion as the storage 157 and user interface 158, respectively. In one example, the source 602 and output 604 are coupled to the device 605 by separate DVI connections. The device 605 is coupled to a voice network 606 via a voice network interface 605a, and coupled to a data network via a data network interface 605b. These may be implemented in similar fashion as the interfaces 152/154, as an example. The media source is a source of multimedia content, which includes multiple forms of content including any of text, audio, still images, video, animation.

Figure 7A:
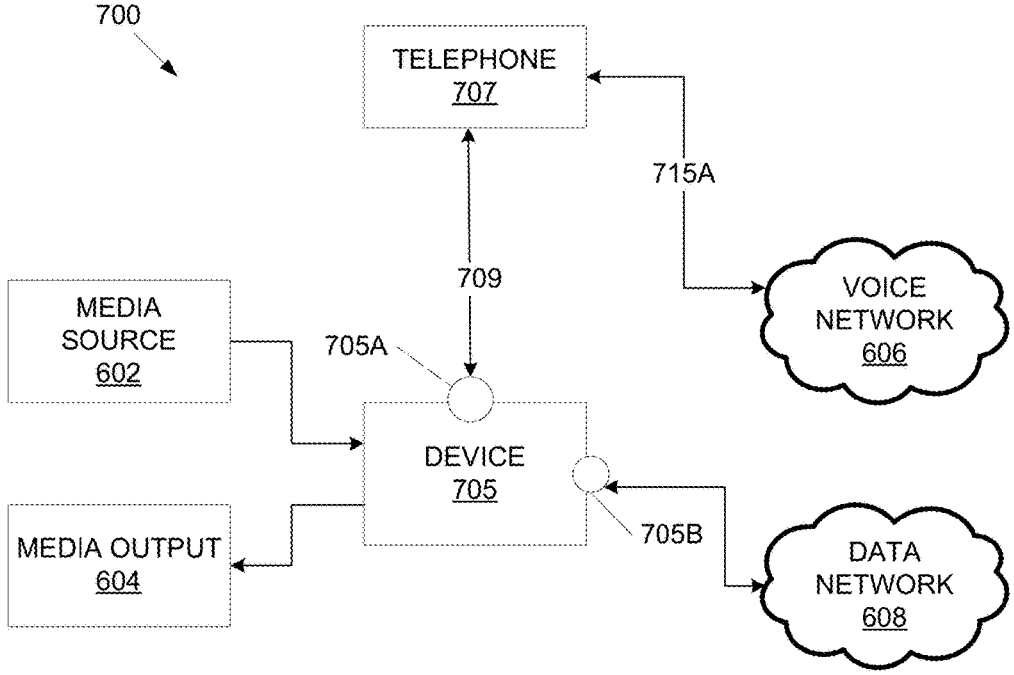

FIG. 7A shows a system 700 similar to FIG. 6, with a telephone 707 being external to the device 705, rather than internal to the device 605. The device 705 is coupled to the voice network 606 via voice network interface 705a, link 709, the telephone 707, and a link 715a. The interface 705a may be implemented in similar fashion as the interfaces 152 or 178/179, for example. In one example, the link 709 may utilize wires, such as wires to the telephone's microphone and speaker jacks. In a different example, the link 709 may employ an open air audio path with the telephone's speaker phone equipment.

Figure 7B:
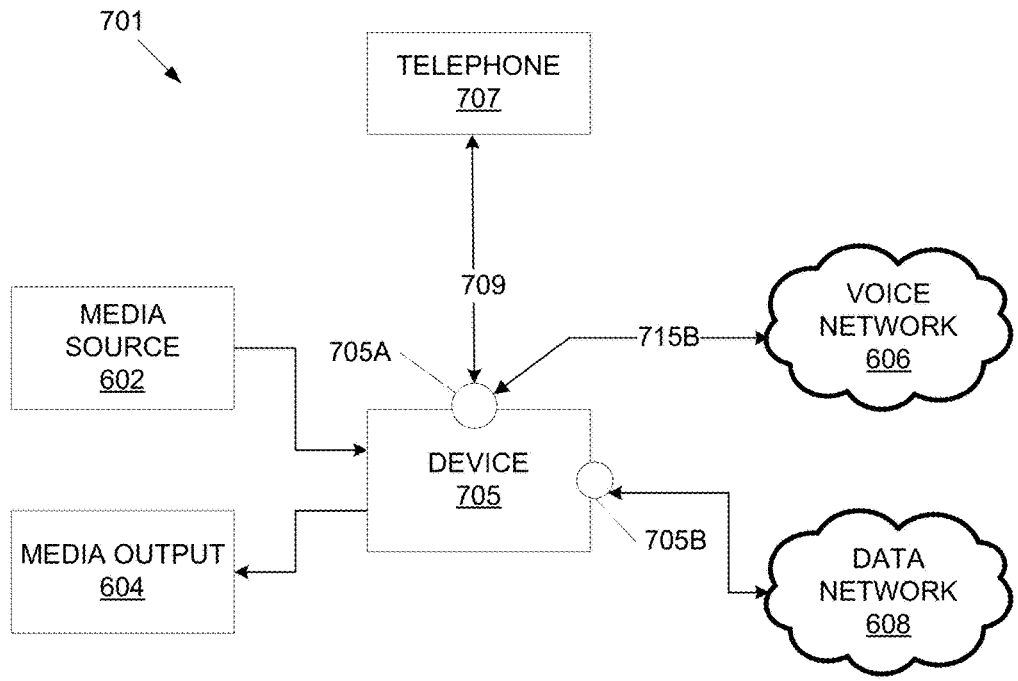

FIG. 7B depicts an alternative 701 to the system 700 of FIG. 7A. Here, the device 705 couples directly from the interface 705a to the voice network 606, bypassing the telephone 707. In this case, a link 715b utilized, and the link 715a (from FIG. 7A) is omitted. With the connection 715b in place, the device 705 may be used with an existing telephone 707, but by interceding between the voice network 606 and the telephone 707, the device 705 can receive audio tones used to set up the data connection and suppress those tones from being heard over the telephone 707. This avoids any possible distraction that could result if the tones were presented to the human user. The interface 705a, for example, may be implemented in similar fashion as the interfaces 152 or 178/179 from FIGS. 1B-1C. The interface 705b may be implemented in similar fashion as the interfaces 154, 176 from FIGS. 1B-1C.

Figure 8A:
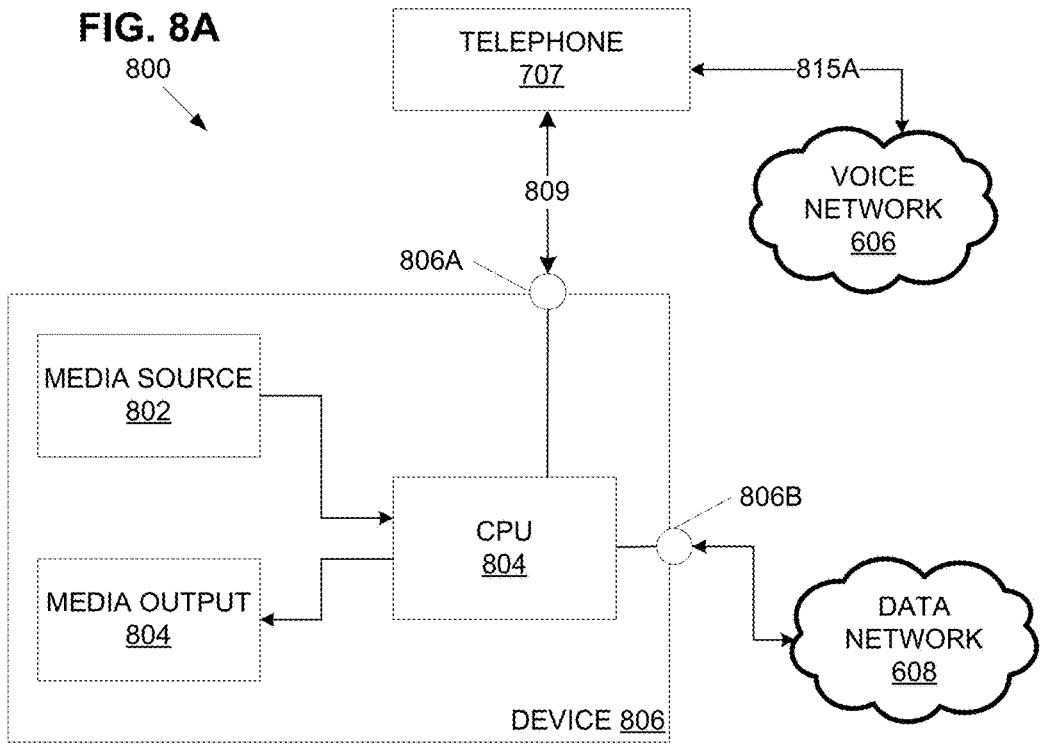

FIG. 8A shows a system 800 where the communications device 806 is implemented by a standalone computer, such as a notebook, workstation, desktop, or such. Accordingly, the device 806 includes a CPU, shown as 804. Of course, the devices 605 and 705 (from FIGS. 6-7B) may also include a CPU although not shown in such diagrams; FIG. 8A shows the CPU 804 to illustrate the option whereby the media source 802 and media output 804 are internal to the device 806. Optionally, the media source 802 may be built-in to the device 806 as shown, with an internal hard drive serving as one example. Likewise, the media output 804 may optionally be built-in to the device 806, with a notebook computer display and speaker serving as one example. The device 806 couples to the data network 608 via an interface 806b, implemented in similar fashion as the interfaces 154 or 176 discussed previously. The device 806 is coupled to the voice network 606 via an interface 806a, link 809, telephone 707, and link 815a. Information travels between the device 806 and telephone 707 via the link 809, similar to the link 709 discussed above.

FIG. 8B depicts an alternative 801 to the system 800 of FIG. 8A. Here, the device 806 couples directly from the interface 806a to the voice network 606, bypassing the telephone 707. In this case, the link 815b utilized, and the link 815a (from FIG. 8A) is omitted.

FIG. 9 shows a system 900 where the communications device 906 is implemented by a wireless telephone such as cell phone. Accordingly, the device 906 uses the telephone's built-in CPU 904 and telephony hardware 907. Optionally, the media source 902 may be built-in to the device 906 as shown, with circuit or hard drive memory serving as one example. Likewise, the media output 904 may optionally be built-in to the device 906, with a cell phone video display and speaker serving as examples. The device 906 couples to the data network 608 via an interface 906b, implemented in similar fashion as the interfaces 154 or 176 discussed previously. The device 906 couples to the voice network 606 via an interface 906a.

Data Processing Components

Introduction

FIGS. 1A-1C and FIGS. 6-9 depict various data processing components. These may be implemented by hardware, software, firmware, or a combination of these. The makeup of these subcomponents is described detail below with reference to FIGS. 2-4.

Digital Data Processing Apparatus

One example for implementing data processing components is a general purpose processor, microprocessor, controller, microcontroller, state machine, digital signal processor (DSP), application specific integrated circuit (ASIC), field programmable gate array (FPGA) or other programmable logic device, discrete gate or transistor logic, discrete hardware components, personal computer, mainframe computer, computer workstation, or any combination designed to function as described herein. A processor may also be implemented as a combination of computing devices, e.g., a combination of a DSP and a microprocessor, a plurality of microprocessors, one or more microprocessors in conjunction with a DSP core, or any other such configuration.

Figure 2:
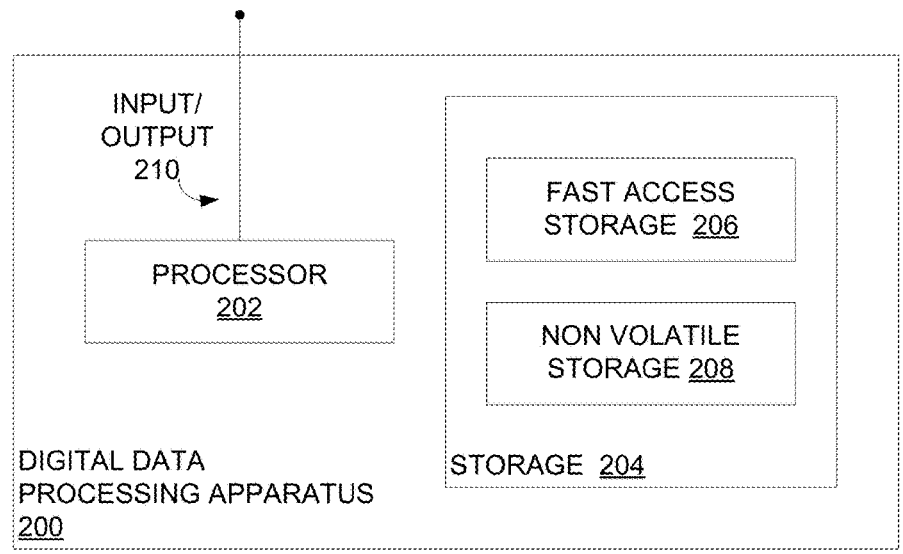
FIG. 2 is a block diagram of a digital data processing machine.
Figure 3:
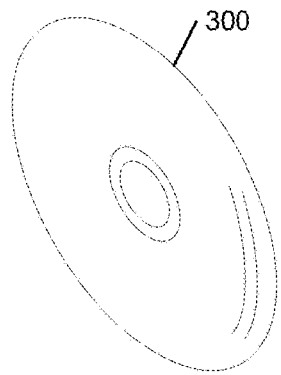
FIG. 3 shows an exemplary storage medium.

As a more specific example, FIG. 2 shows a digital data processing apparatus 200 with a processor 202 coupled to a digital data storage 204. Here, the storage 204 includes a fast-access storage 206 and nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, some of the disclosed components employ digital data storage. Depending upon its application, this digital data storage may be used for various functions, such as storing data, storing machine-readable instructions, or both. These instructions may carry out the ultimate processing functions, or they may serve to install a software program upon a computer, where such software program is then executable to perform the ultimate processing functions.

In any case, the storage media may be implemented by nearly any mechanism to digitally store machine-readable signals. One example is optical storage such as CD-ROM, WORM, DVD, digital optical tape, disk storage 200 (FIG. 2), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

Logic Circuitry

Figure 4:
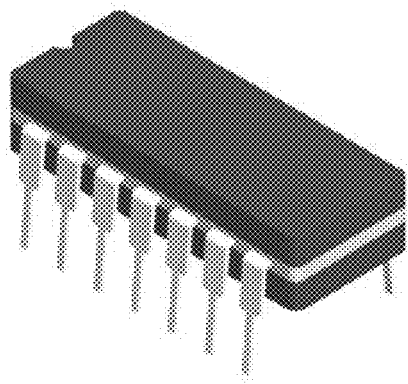
FIG. 4 is a perspective view of exemplary logic circuitry.

In contrast to storage media that contain machine-executable instructions (as described above), a different embodiment uses logic circuitry to implement processing functionality. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 4 shows an example of logic circuitry in the form of an integrated circuit 400.

Operation

Introduction

Figure 5:
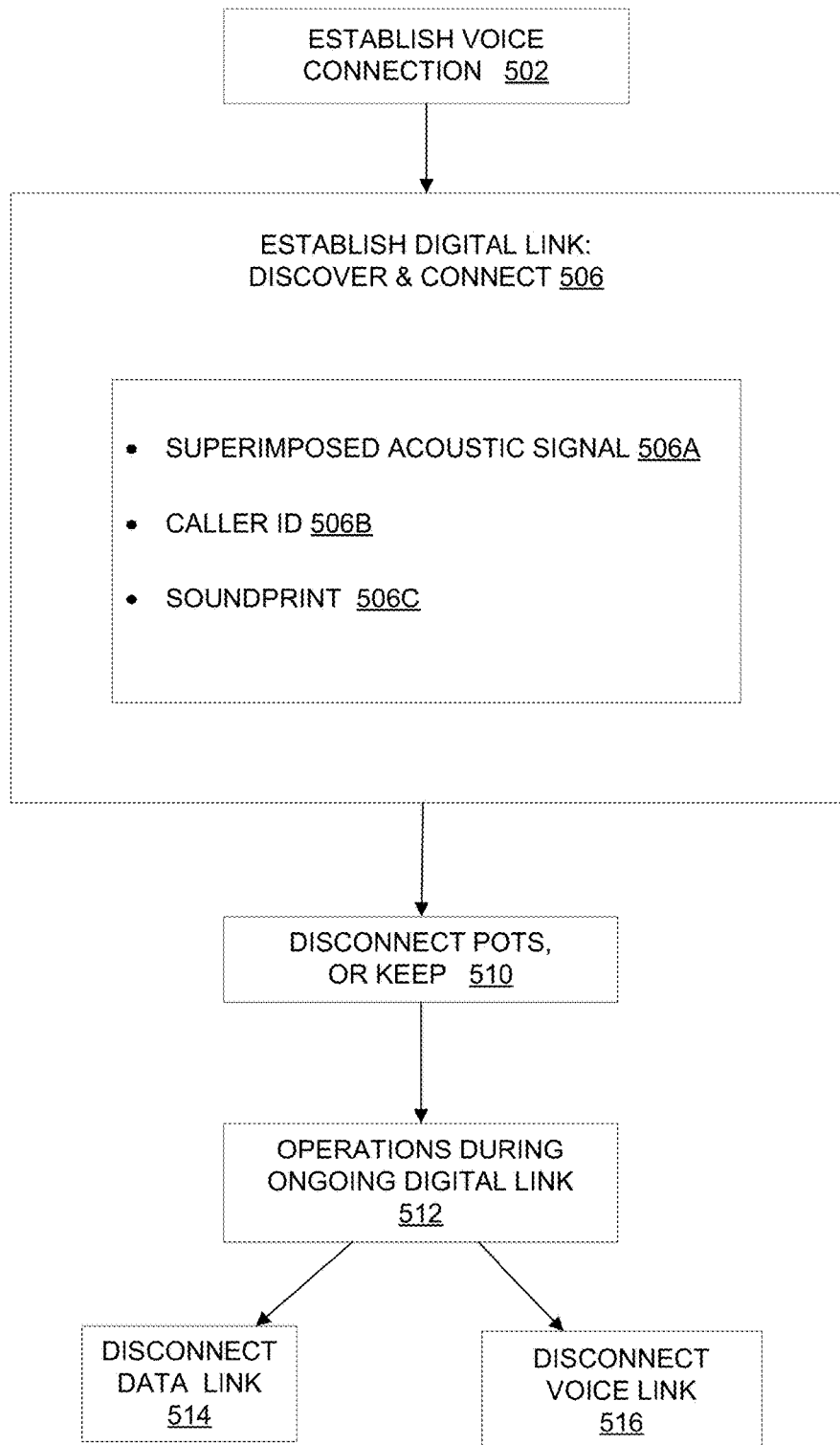
FIG. 5 is a flowchart of a method for establishing a data link.

Having described various structural features, some operational aspects are described next. Referring to FIG. 5, the sequence 500 first establishes a voice POTS connection (502). Then, the sequence 500 leverages machine-readable content or features of the POTS connection to establish (506) a data link between the parties. This data link is used to conduct a multimedia conference between the parties using digital data over the data network 112. The multimedia content transmitted over the data network may include video, still images, animation, text, audio, and the like.

The POTS connection may be kept or disconnected (510). If the POTS connection is kept, the POTS connection may be maintained to provide audio, in which case the data link may be used exclusively for video, presentations, and other non-audio content. If the POTS connection is disconnected, the data link also transmits the audio portion of the connection. Further operations (512) may be performed during the video conference, as discussed in detail below. The data link is ultimately disconnected in step 514. The POTS connection, if retained in step 510, is disconnected in step 516, which may occur concurrently with disconnection (514) of the data link, or before, or after.

Without any intended limitation, details of the sequence 500 are discussed primarily using the example where the party 106 (calling party) initiates a POTS call to the party 108 (called party) in accordance with FIG. 1A, where each party uses a device 170 as shown in FIG. 1C.

POTS Call Setup

In step 502, the calling party 106 uses the telephone 175 to dial the party 108. The call rings through, the party 108 answers, and the POTS connection is established via 120, 111, 122. Alternatively, each of the parties 106, 108 uses its respective telephone (175) to dial the bridge 115, which connects the POTS call. In the case of three or more parties, each party calls the bridge 115 in this manner.

Setup of Data Link

Introduction

In step 506, one or all of the parties 106, 108 initiate the data link, or this may occur automatically in response to one or more parties' CPUs 180 sensing a completed POTS call. In one example, a party can initiate the data link via the user interface 177, for example by pushing a "DATA CONNECT" or "IDENTIFY" button, or entering a prescribed keypad sequence, or uttering a prescribed voice command, or provided other explicit input. As an alternative, when a device 170 capable of forming a digital network connection joins a voice connection, it presents an audible cue over the voice connection, indicating that the device seeks to establish a digital network connection. In response, any other capable devices 170 already participating in the voice connection begin the step 506 of establishing a digital network connection. In still another approach, each device 170 is programmed to automatically detect the presence of prescribed types of information suitable for sending over the data network 112. For example, this may be satisfied by a user connecting a video camera to the device, or starting presentation software, or connecting a laptop computer running such software, and similar events.

In step 506, the parties' respective devices 107, 109, and optionally the rendezvous server 114, advantageously leverage machine-readable content or features of the POTS connection to automatically establish the data link, while requiring minimal user input. As described in detail below, step 506 may be carried out in different ways (506a-506c). These may be different alternatives of implementation, or all of these approaches may be implemented concurrently and available to parties in order to offer users a greater number of call setup options.

Acoustic Signals 506a (No Rendezvous Server)

For ease of discussion, the example of 506a is first described in the context of two parties. Here, the initiating party 106's CPU 180 transmits machine-readable acoustic signals to the other party via the POTS interface 178, line 172, jack 171, link 120, network 111, and link 122. The receiving party 108 sends and receives similar signals in like fashion, back to the party 106. These exchanged signals contain the minimum information needed to setup a data link via the network 112, including at least the parties' respective addresses on the data network 112. If the parties' devices 170 are not already connected to the network, the devices CPUs 180 direct their respective interfaces 176 to connect to the network 112 and obtain a network address. The network address may be, for example, an IP address. Thus, in step

506a, both parties 106, 108 work together via the POTS call to discover each other's presence on the network 112.

As an alternative, instead of the case where each party transmits acoustic signals to the other party, party A may transmit acoustic signals representing its data network address, but party B refrains from transmitting any acoustic signals. Instead, party B responds by transmitting its address on the data network 112 directly to the data network address of party A, as represented by party A's acoustic transmission.

Optionally, the devices 170 may take steps to minimize the acoustic signal's disruption to voice communications on the POTS call. For example, the devices 170 may limit the acoustic signals exchanged over the POTS call to short duration bursts, or conduct them over a long time using a low volume. Furthermore, information communicated by the devices over the POTS connection may be compressed as fully as possible prior to transmission.

The devices may transmit the acoustic information using conventional acoustic encoding schemes, such as DTMF or text-to-speech and voice-recognition. Alternatively, the devices may encode the information within less intrusive audio that can be decoded by the receiving devices. For example, a party's device may steganographically encode the information within a synthesized voice announcing the identity of the party, or modulate the clicks and pops commonly observed within the existing noise floor. In a further embodiment, the devices may transmit the information in a manner completely inaudible to the users, such as by using frequency division multiplexing.

If the data network 112 is a routed network, e.g., the network address is an IP address, each party's receipt of the other's network address effectively establishes a data link, in that each party's device is now reachable by the other party's device. If the digital network supports persistent, dedicated data links between devices, each of the devices receiving the broadcast address establishes a pair wise data link with the other.

In contrast to the two-party embodiment, wherein the parties call each other, if there are three or more parties then the parties call in to the bridge 115. In this embodiment, the bridge 115 may be satisfied by a commercially available conference calling bridge. If the data network 112 is a routed network, when a device 170 joins the POTS connection and the other devices receive the joining device's network address, this effectively establishes a data link in that the joining device is now reachable by each of the other participating devices. If the digital network supports persistent, dedicated data links between devices, each of the devices receiving the broadcast address establishes a pair wise data link with the joining device.

In the event that one device requests to establish a digital network connection with devices already participating in a digital network connection, the responding devices, for redundancy reasons, may respond with network addresses of the other devices participating in the existing digital network connection. For example, suppose that devices A and B have already established a digital network connection, and device C joins a voice connection including A and B. If device C requests that a digital network connection be established by transmitting its network location, A can send both its network address and the network address of B to C over the voice or data network; in the case of the transmissions over the voice network, this step minimizes disruption on the voice connection. Similarly, B can respond by sending network addresses for both B and A. This increases the likelihood that C will receive network addresses for all capable devices despite unreliability that may be present in the voice or digital networks. Again, the response to C's request may be transmitted acoustically via the voice network 111, or directly to C's network location via the data network 112.

Acoustic Signals 506a (Rendezvous Server Employed)

As an alternative to the preceding example, which does not employ the rendezvous server 114, step 506a may be implemented using the rendezvous server 114 while retaining the acoustic signal feature.

Here, the parties setup the POTS call as described above. Then, the devices 170 decide upon and then exchange a unique identifier (ID) over the POTS call. This can but need not be a network address, and in fact, the unique ID may be a preassigned user name or password or other unique code. The network address is not necessary at this point because the server 114 facilitates completion of the data link instead of the parties directly exchanging network addresses. Here, the POTS call is used to exchange the unique ID.

In one example, the unique ID is determined based on applying a predetermined computation to the current date or time, so that all parties come up with the same unique ID. Or, the device of the first party to join the POTS call may choose the unique ID, or submit a unique ID pre-assigned to that party. In another example, instead of a common unique ID among all parties, every party has a pre-assigned unique ID and each party submits its own unique ID and obtains the unique IDs of every other party. There are many other ways to resolve the unique ID.

The rendezvous server 114 has a known or published or ascertainable address on the network 112 so as to be readily accessible by the parties' devices. Accordingly, each party's device 170 contacts the rendezvous server 114 at a predetermined network address, provides the unique ID or IDs, obtained from the other party via the acoustic signal superimposed over the POTS call, and requests the server to open a data link with the other parties. The server 114 identifies matching requests and establishes a data link between the participating devices. The manner of establishing the data link is discussed in greater detail below.

The action of the rendezvous server 114 is described, in a more specific example, as follows. In this example, the server 114 maintains rendezvous data links that any number of parties may join. Here, the server 114 facilitates a new addition to the data link upon receipt of symmetric requests in which (1) A requests to join a data link, (2) A requests that B be added to its data link, (3) B requests to join a data link, and (4) B requests that A be added to its data link. Or, the server adds a device to an existing data link upon receipt of asymmetric requests in which (1) C requests to join a data link, and (2) one or more of D,E, . . . N request that C be added to their existing data link. This may be implemented in different ways. For example, the operation of C's device contacting the rendezvous server 114 may be automatic or it may be conditioned on one existing party's approval of C conveyed via their interface 177, or conditioned on approval of all existing parties to the data link as conveyed via their respective interfaces 177.

If desired, step 506a may be implemented to allow subsequent parties to join the existing data link in an un-confirmed manner. That is, the server 114 does not require that another party invite the subsequent party to join the data link. This party's act of supplying the unique ID already validates the new party.

As with the non-server example given above, the devices may transmit the acoustic information using conventional acoustic encoding schemes or less intrusive audio. For example, each party's device may steganographically encode the information within a synthesized voice announcing the identity of that party. In the case of a three or more parties, this announcement may occur when a party joins the POTS connection.

If this embodiment, using acoustic signals and the rendezvous server 114, is be carried out for three or more parties, parties setup the POTS call by calling in to the bridge 115.

Caller ID 506b

In the embodiment of step 506b, the server 114 facilitates the data link, but caller ID information obtained via the POTS call (or calls) is used to identify a party (or parties) to the server 114, as discussed below. The rendezvous server 114 has a known or published or ascertainable address on the network 112 so as to be readily accessible by the parties' devices.

This approach differs from the embodiment of 506a in that it (1) does not overlay acoustic signals to an ongoing POTS call to help in setting up the data link, and (2) requires participation of the server 114. Furthermore, the mechanism for connecting multiple parties is different.

In the two-party example, the parties first establish a POTS call. Then, the following events take place, automatically or in response to user approval conveyed via the interface 177. The calling party 106 submits the following data to the rendezvous server 114: (A) the calling party 106's own telephone number, which is pre-programmed into the device 170, and (B) the called party 108's telephone number, which is known to the CPU 170, by monitoring the user's operation of the telephone keypad 175. The called party 108 submits the following data to the rendezvous server 114: (A) the called party's own telephone number, pre-programmed into the device 170, and (B) the calling party's telephone number, known to the CPU 170 by monitoring the incoming call an detecting the caller ID or other CNID code. The parties may also submit their respective network addresses, or the rendezvous server 114 may detect them automatically upon connection to the server.

The rendezvous server 114 receives the parties requests, cross-references the received telephone numbers, and recognizes that calling party 106 seeks a digital link with called party 108, and vice versa. In response, the server 114 helps establish a data link between the parties, the details of which are explained below.

In order to accommodate three or more parties, step 506b uses a proprietary conference calling bridge (implemented at 115), capable of distinguishing and recording caller-ID codes from each party that calls in. In a different example, to accommodate three or more parties, a new party must place a POTS call to one of the current participants in the data link. Then, the communication devices of the calling party and called party communicate with the rendezvous server 114 in the same manner as discussed above, except that the server 114 functions to add the new party to the data link instead of setting up a new data link.

In the proprietary conference calling bridge implementation, the parties need not use the devices 150, 170. In contrast, this example may be carried out for a given party by using a telephone and a computer programmed with the network address of the rendezvous server 114.

In the embodiment with three or more parties, the addition of the new party to the data link may be implemented in different ways. For example, this may occur automatically, or it may be conditioned on an existing party's approval of the new party conveyed via the interface 177, or it may be conditioned on approval of all existing parties to the data link as conveyed via their respective interfaces 177.

For instance, the rendezvous server 114 may establish a data link upon receipt of symmetric requests in which (1) A requests to join a data link, (2) A requests that B be added to its data link, (3) B requests to join a data link, and (4) B requests that A be added to its data link, and the server adds a device to an existing data link upon receipt of asymmetric requests in which (1) C requests to join a data link, and (2) one or more of D,E, . . . N request that C be added to their existing data link.

Soundprint 506c

The alternative of step 506c, like the alternative 506b, does not introduce machine-readable acoustic signals to an ongoing POTS call to set up the data link. Rather, in this alternative, the devices 170 computationally analyze acoustic content of the POTS call to create a soundprint. This takes place automatically or in response to user approval conveyed via the interface 177. The timing or duration of the analyzed content is not critical, as long as both devices 170 use the same or substantially similar formula for computing the soundprint.

In this approach, upon joining a POTS connection, each party's device 170 monitors the conversation to calculate a numeric descriptor of the conversation. The descriptor may, for example, be computed based using a binned FFT or other commonly implemented audio fingerprinting technique. Alternatively, the descriptor may be based upon the conversational pause rate, or word length counting. Word length counting is pause independent and works well in situations where speakers do not interrupt each other. Preferably, to mitigate the effects of latency, pause rates are separately computed for the local and remote speech signals and combined to obtain the descriptor. This approach requires that the descriptor be sufficiently accurate and unique that the likelihood of a random collision between descriptors, i.e., false-positives, either inadvertent or malicious, is remote. If the likelihood of false positives is sufficiently minimized, the likelihood of false negatives can be reduced by allowing the device to submit several descriptors computed using a variety of techniques.

In one embodiment, the descriptor is time invariant and robust to variations in line noise or latency between one device and another. To the extent that the descriptor does vary over the length of the POTS connection, e.g., as new devices join the connection, the devices participating in a data link may periodically recompute descriptors and submit them to the server, thereby ensuring that any device joining the POTS connection is successful in joining the data link upon contacting the server. One approach is to compute the fingerprint continuously and update the remote server periodically.

Having prepared their soundprints, the parties' devices 170 submit respective requests to the rendezvous server 114 via the network 112. These request include, at minimum, that parties' respective soundprints. Optionally, the parties may also track the time at which the POTS call was opened, and additionally submit this to the rendezvous server 114. The parties may further submit their respective addresses on the network 112, or the rendezvous server may detect them automatically.

The rendezvous server 114 receives the parties' requests, and compares each soundprint to a stored database of soundprints received from various parties. The server 114 may use the parties' reported call start times to narrow down the list of soundprints to examine, and speed the comparison. Upon finding requests with matching soundprints, the server 114 helps establish a digital link between the parties that submitted the matching soundprints.

In the case of two parties, they employ the soundprint example (506c) by calling each other directly. If there are three or more parties seeking to form a data link, then the parties may call-in to the bridge 115. A conventional bridge service may be used here, without requiring any proprietary features.

If desired, step 506c may be implemented to allow subsequent parties to join the existing data link in an un-confirmed manner. That is, the server 114 does not require that another party invite the subsequent party to join the data link. This party's act of supplying the valid soundprint already validates the new party.

More About Completing the Data Link

As mentioned above, the operation 506 involves the parties discovering each other and then the devices 170 connecting via the network 112. In one embodiment, each device 170 connects directly to the other party's network address obtained from the other party. Alternatively, the server 114 broadcasts the parties' network addresses to all parties, whereupon the parties can connect to each other directly.

Or, the server 114 itself forms a data link between the devices 170. Here, instead of providing each party with the other party's network address to complete discovery (506), the server 114 connects the parties' devices 170 via the server itself. In this embodiment, the server 114 need not relay each party's network address to the other, since the parties' devices 170 only need the network address of the server 114. As another approach, the server 114 may initially conduct the data link through itself, and then negotiate a direct connection between the parties as it becomes possible with the passage of time, to conserve resources.

Fail-Safe Mode

As an alternative to steps 506a-506c, the device 170 device may offer a fail-safe mode of establishing a data link in which the users participating in the POTS connection verbally agree among themselves on a method of establishing the data link. The users may, for example, agree upon a "session ID" for a rendezvous link maintained by the server 114, or simply exchange their respective network addresses to enable the establishment of pair wise data links. Any such addresses may be acquired via voice recognition or manually entered at via a number pad or keyboard of the interface 177.

Disconnect POTS

After the data link is established (506), the parties may disconnect the POTS connection (510). Alternatively, the parties may retain the POTS connection for the audio portion of the call, and use the digital link to relay multimedia such as real time video, presentation content, and the like.

Operations During Ongoing Data Link

In step 512, during the ongoing data link, the devices 170 may perform additional functions to employ or take advantage of features of the data link. For example, each device 170 may capture a digital image of local users prior to initiation of the POTS connection and transfer the image across the data link for display on remote devices. For POTS connections involving three or more devices, each device determines locally if it is active, based on microphone signal levels, and broadcasts an active status to the remote devices by transmitting an active speaker flag over the data link. Then, each device uses the active speaker flags to locally display images, or visually highlights an already-displayed images, associated with active remote devices, that is, the remote devices at which a user is speaking. Or, each device 170 may analyze the network addresses of data received over the data link to determine which other party or parties are currently speaking, and then display or highlights the user image of each corresponding speaker. In a different example, custom software sends still pictures and voting metadata over the network.

In other examples of step 512, known software packages may use the data link, with some examples including NETMEETING™, LIVEMEETING™, SKYPE™, ICHAT™, etc., where the device 170 (in one example) invokes an API to remotely control the software package into connecting automatically.

During step 512, once the digital network connections have been established, the devices participating in the digital network connection may negotiate sending and receiving roles for communication over the digital network. In one approach, a user of a device presses a button or otherwise provides an explicit input that s/he wishes to send digital content over the digital network for review by the other participants. The sending device transmits a send request over the digital network. Devices receiving the send request enter into a receiving mode, awaiting the data from the sending device. The send request may include a time stamp to ensure that, in the event of a race condition, all devices agree upon which device will assume the sending role. Optionally, the network address of the device transmitting the send request can be appended to send request to resolve truly simultaneous requests.

Despite the foregoing example, the system may be implemented to provide simultaneous sending and receiving, known as full duplex communications. This avoids the need to negotiate sending and receiving roles.

Disconnect

When the parties desire, they may disconnect the data link (514). For instance, the device 170 may be programmed to disconnect in response to a prescribed button push, code sequence, voice command, or other user command received at the interface 177. In response, the device 170 directs the interface 176 to drop the digital link with the other party.

As to the POTS connection, if still active, the device 170 may retain it or drop it (step 516) automatically or upon user input. In one example, the devices may automatically disconnect their data links (step 514) in response to sensing that their POTS connections have disconnected (516). Thus, in this example, the party can disconnect completely by hanging up the POTS connection.

Security Enhancements

Optionally, the foregoing process may be supplemented by a number of security techniques. For example, upon initially joining a data link, the server 114 may prompt a joining device 170 for a passcode or password.

Furthermore, the sequence 500 may employ a two-factor authentication, taking advantage of the parallel communications channels, i.e., POTS and the data link. Because call participants have access to two parallel communications channels, i.e., voice and data, this can be used to provide even greater security. In theory, a remote adversary may have tapped the phone or the data connection, but it is less likely that the adversary has access to both channels, especially if they are remote and somewhere in the middle.

In this example, one party's device 170 synthesizes a voice giving a password over the POTS connection, and the remote parties must enter the password into their respective keypads, thus completing the link loop over the data connection. Alternatively, this may be completely automated with acoustic encodings and the like, with no requirement for the users to do anything. The password requirement is enforced by the server 114 in one implementation, or by the parties' devices 170 in a different implementation. In any case, by automatically asking every communication device that joins the conference to do this, this adds a layer of security to the system. Someone with a laptop and tapping the data connection would not be able to connect unless they had access to the sounds on the POTS line.

As another security feature, the devices may employ contents of the data link in computing an authentication token. The computation of the token may be similar to the soundprint computation described above for the voice link. In one embodiment, a device analyzes the sound represented by analog signals sent to the user's telephone speaker and received by the user's telephone microphone, received via analog-to-digital converter built into a component such as 158 or 179. In a different embodiment, a device reconstructs and analyzes transmitted and received data packets to determine the sound of the conversation, and analyzes the resultant sound.

By comparing the soundprint calculated for a past conversation with other users, the parties can confirm that their conversation took place as they assumed. This is analogous to each party having a checksum or error correction code for the data link communications, and as long as each party's checksum matches the other parties' checksums, the conversations are intact. In this example, the devices 170 may present the respective party with a real-time, ongoing token for this purpose, or compute a comprehensive token after the call. If done after the fact, it may be particularly beneficial to compute the token based on all, or substantially all, of the conversation, to avoid the scenario where some of the conversation is omitted from the token and therefore subject to undetected tampering. The devices 170 may automatically or manually present the tokens to the respective users, or after the parties' request to terminate the data link, negotiate with the other devices to compare tokens and present the results to the respective parties. Other variations and adaptations of this core teaching will be apparent to ordinarily skilled artisans, having the benefit of this disclosure.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the present invention, and the scope of the present invention fully encompasses other embodiments which may become obvious to those skilled in the art, and that the scope of the present invention is accordingly to be limited by nothing other than the appended claims.

No element, component, or method step in the present disclosure is intended to be dedicated to the public regardless of whether the element, component, or method step is explicitly recited in the claims. No claim element herein is to be construed under the provisions of 35 USC § 112, sixth paragraph, unless the element is expressly recited using the phrase "means for" or, in the case of a method claim, the phrase "step for."

Although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order

The invention claimed is:

1. A communications apparatus having a local party corresponding thereto, the communications apparatus comprising:
 a microphone;
 a data interface; and
 coupled to the data interface, a digital data processing device programmed to perform machine-implemented operations comprising:
  during an established telephone connection between the local party and a remote party having a remote communications apparatus that includes a remote microphone, capturing a sound signal through the microphone corresponding to the local party, and capturing an incoming acoustic signal from the remote party through the remote microphone corresponding to the remote party;
  analyzing the sound signal as captured through the microphone corresponding to the local party and the incoming acoustic signal from the remote party, as captured through the remote microphone corresponding to the remote party, to identify the telephone connection; and
  submitting the result of the analysis to a rendezvous server over the data interface for identification of the telephone connection by the rendezvous server.

2. The communications apparatus of claim 1, wherein analyzing the sound signal as captured through the microphone corresponding to the local party and the incoming acoustic signal captured through the remote microphone from the remote party to identify the telephone connection includes:
 forming a soundprint for the local party, wherein the soundprint comprises any of an acoustic fingerprint for the local party and a digital fingerprint for the local party.

3. The communications apparatus of claim 2, wherein the operations performed by the digital data processing device further comprise:
 receiving an IP address from the rendezvous server; and
 establishing a digital data link over the data interface with the remote party using the IP address received from the rendezvous server.

4. The communications apparatus of claim 3, further comprising:
 exchanging multimedia content representing human-readable communications between the local party and the remote party over the digital data link.

5. The communications apparatus of claim 2, wherein the operations performed by the digital data processing device further comprise:
 establishing a digital data link over the data interface with the rendezvous server;
 sending data destined for the remote party to the rendezvous server over the digital data link; and
 receiving data from the remote party via the rendezvous server over the digital data link.

6. The communications apparatus of claim 5, further comprising:

exchanging multimedia content representing human-readable communications between the local party and the remote party over the digital data link.

7. The communications apparatus of claim 1, wherein analyzing the sound signal as captured through the microphone corresponding to the local party and the incoming acoustic signal captured through the remote microphone from the remote party includes:
performing a computational analysis of data captured by the microphone to identify a phone number dialed.

8. The communications apparatus of claim 5, further comprising:
receiving an IP address from the rendezvous server; and
establishing a digital data link over the data interface with the remote party using the IP address received from the rendezvous server.

9. The communications apparatus of claim 8, further comprising:
exchanging multimedia content representing human-readable communications between the local party and the remote party over the digital data link.

10. The communications apparatus of claim 1, wherein the established telephone connection includes a conversation between the local party and the remote party, and wherein analyzing the sound signal as captured through the microphone corresponding to the local party and the incoming acoustic signal captured through the remote microphone from the remote party includes analyzing the conversation to identify the telephone connection, wherein the conversation includes both the sound signal as captured through the local microphone and the incoming acoustic signal as captured through the remote microphone from the remote party.

11. A computer implemented method to establish a data link between parties, each party having a computer and a telephone, the method comprising:
establishing a telephone connection between the parties over a public telephone network either directly or via a conference calling bridge;
connecting the computers to a prescribed packet data network and automatically acquiring addresses on the prescribed packet data network;
capturing a sound signal through a microphone corresponding to a local party of the parties and capturing an incoming acoustic signal through a remote microphone corresponding to a remote party of the parties;
computationally analyzing the sound signal as captured through the microphone corresponding to the local party and the incoming acoustic signal as captured through the remote microphone corresponding to the remote party, to identify the telephone connection at any of the computers or a rendezvous server;
using the identification of the telephone connection to automatically establish a data link between the computers via the prescribed packet data network and the addresses on the prescribed packet data network;
providing a respective user image for capture or receipt at each party's computer; and
after the data link is established, exchanging user images over the data link with others of the computers participating in the data link.

12. The computer implemented method of claim 11, further comprising:
employing the established data link to exchange multimedia content representing human readable communications between the parties.

13. The computer implemented method of claim 12, wherein the employing the established data link to exchange multimedia content further comprises:
exchanging items including any of word processor documents, slideshow presentations, video presentation, spreadsheets, and images of scanned paper documents.

14. The computer implemented method of claim 13, further comprising:
permitting the parties to collaboratively edit the exchanged items.

15. The computer implemented method of claim 11, wherein the established telephone connection includes a conversation between the local party and the remote party, and wherein computationally analyzing the sound signal as captured through the microphone corresponding to the local party and the incoming acoustic signal captured through the remote microphone from the remote party includes analyzing the conversation to identify the telephone connection, wherein the conversation includes both the sound signal as captured through the local microphone and the incoming acoustic signal as captured through the remote microphone from the remote party.

16. A computer implemented method to authenticate a data link between parties, each party having a computer and a telephone, the method comprising:
establishing a telephone connection between the parties over a public telephone network either directly or via a conference calling bridge;
connecting the computers to a prescribed packet data network;
establishing a data link between the computers via the prescribed packet data network;
capturing a sound signal through a microphone associated with a local party of the parties and capturing an incoming acoustic signal through a remote microphone associated with a remote party of the parties;
computationally analyzing the sound signal as captured through the microphone associated with the local party and the incoming acoustic signal as captured through the remote microphone associated with the remote party, to authenticate the identity of the telephone connection; and
based on the authentication of the identity of the telephone connection, employing the established data link to exchange multimedia content representing human-readable communications between the parties.

17. The computer implemented method of claim 16, wherein the authentication of the identity of the telephone connection further comprises:
exchanging audible, machine-readable acoustic signals between the parties.

18. The computer implemented method of claim 17, further comprising:
forming a soundprint for each of the parties from corresponding captured sound signals, wherein the formed soundprints comprise any of acoustic fingerprints and digital fingerprints; and
submitting the formed soundprints to the rendezvous server.

19. The computer implemented method of claim 18, wherein the authentication of the identity of the telephone connection further comprises:
informing the computers that submitted the formed soundprints of a match as determined by the rendezvous server by comparing the formed soundprints received.

20. The computer implemented method of claim 16, further comprising:
   forming a soundprint for each of the parties from corresponding captured sound signals, wherein the formed soundprints comprise any of acoustic fingerprints and digital fingerprints; and
   submitting the formed soundprints to each of the other parties over the data link.

21. The computer implemented method of claim 16, wherein the authentication of the identity of the telephone connection further comprises:
   generating and transmitting a human audible prompt upon establishing the telephone connection; and
   as a condition to admitting a given party to the data link, requiring the given party to operate the party's computer to enter a prescribed response to the prompt.

22. The computer implemented method of claim 16, wherein establishing a data link between the computers via the prescribed packet data network further comprises:
   establishing a data link to a rendezvous server.

23. The computer implemented method of claim 16, wherein the established telephone connection includes a conversation between the local party and the remote party, and wherein computationally analyzing the sound signal as captured through the microphone corresponding to the local party and the incoming acoustic signal captured through the remote microphone from the remote party includes analyzing the conversation to identify the telephone connection, wherein the conversation includes both the sound signal as captured through the local microphone and the incoming acoustic signal as captured through the remote microphone from the remote party.

* * * * *